United States Patent [19]

Oehlerking

[11] 3,879,074

[45] Apr. 22, 1975

[54] VEHICLE BUMPER ARRANGEMENT

[75] Inventor: Conrad Oehlerking, Braunschweig, Germany

[73] Assignee: Volkswagenwerk Aktiengesellschaft, Wolfsburg, Germany

[22] Filed: Jan. 24, 1974

[21] Appl. No.: 436,119

[30] Foreign Application Priority Data
Feb. 3, 1973 Germany............................ 2305417

[52] U.S. Cl. ................................................. 293/68
[51] Int. Cl. ............................................ B60r 19/04
[58] Field of Search............................... 293/68, 90

[56] References Cited
UNITED STATES PATENTS
2,890,076   6/1959   Baechler............................... 293/90

Primary Examiner—Richard A. Schacher
Assistant Examiner—Robert Saifer
Attorney, Agent, or Firm—Brumbaugh, Graves, Donohue & Raymond

[57] ABSTRACT

A vehicle has, at least one end, bumper appararatus that includes a bumper oriented transversely of the vehicle and located at a particular distance from a traveled surface on which the vehicle is supported. In order to maintain the distance between the bumper and the traveled surface generally constant, a support is provided for the bumper. The support is coupled to two mounts that impart different movements to the support upon movement generally perpendicular to the traveled surface by a vehicle body portion located adjacent the bumper. The different movements imparted to the support effect movement of the bumper relative to the adjacent vehicle body portion opposite in direction and approximately equal in amplitude to the movement of the vehicle body portion. In one embodiment, the support includes a lever and the bumper is mounted at one end of the lever. The lever is coupled to its two mounts at its other end and intermediate its ends, respectively.

4 Claims, 5 Drawing Figures

PATENTED APR 22 1975　　3,879,074
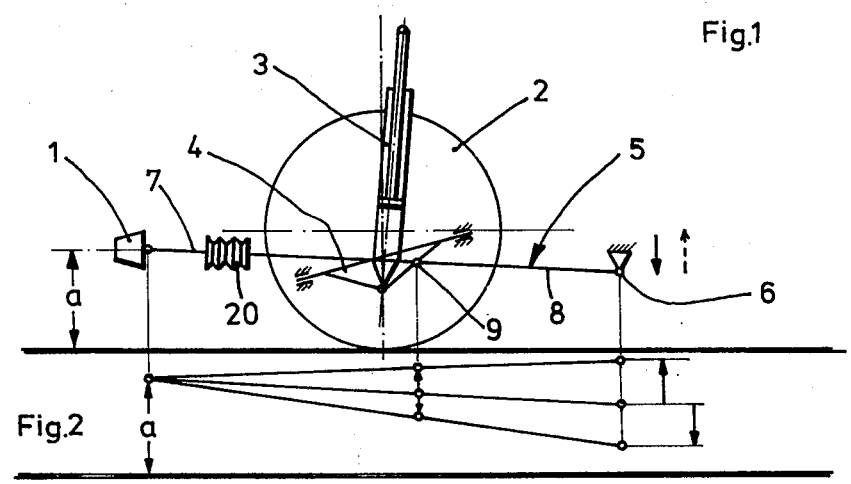
Fig.1
Fig.2
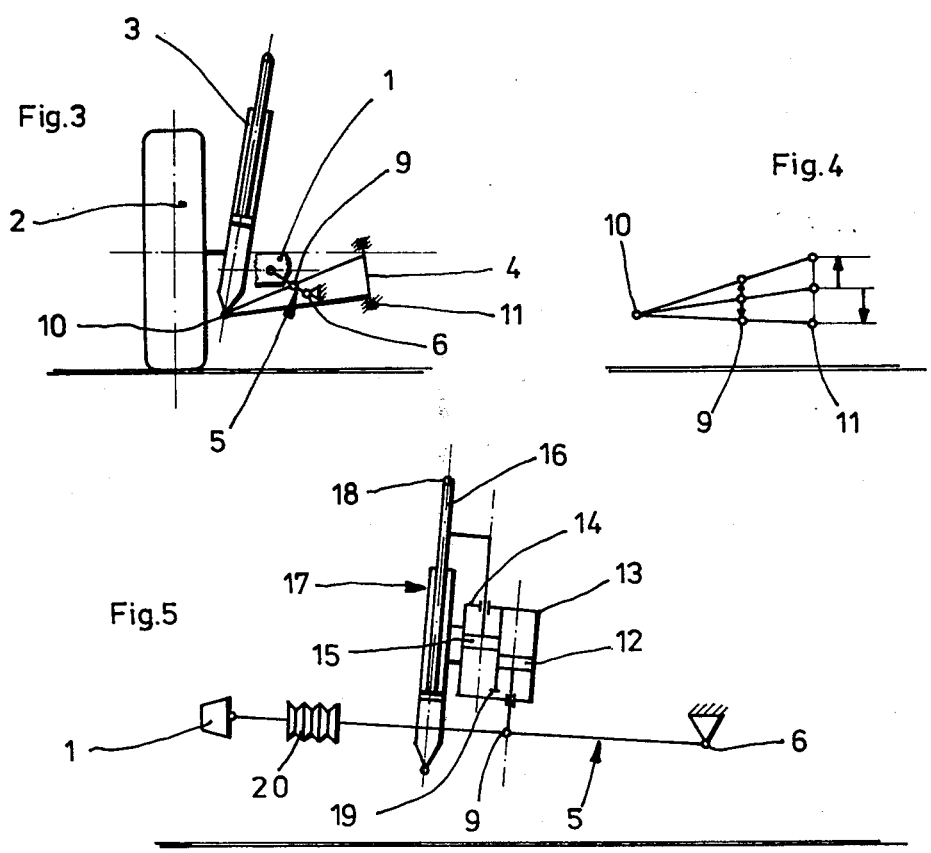
Fig.3
Fig.4
Fig.5

VEHICLE BUMPER ARRANGEMENT

BACKGROUND OF THE INVENTION

In most presently manufactured vehicles, such as automobiles, bumper apparatus is provided at at least one end of a vehicle, and generally at both ends, so that at least one bumper extends transversely of the vehicle at a predetermined distance from the surface on which the vehicle is supported. Additionally, the vehicle frame and body are generally coupled resiliently to the vehicle wheels, or other supporting members, in order to increase the riding comfort of vehicle passengers. Since the bumper is attached to a portion of the vehicle body or frame, the bumper moves with the body or frame relative to the traveled surface. In an automobile, relative movement between the automobile body and a roadway may result, for example, from variations in the load carried by the automobile or from unevenness of the roadway. Considerable reduction of the vertical distance between an automobile body and the roadway may also occur upon sudden braking of the automobile.

Variations in the distance between an automobile bumper and a roadway diminish the effectiveness of the bumper in the event of a collision because the bumper may not be located at its most effective height. In particular, the bumper will be more effective if it coincides with the bumper of another automobile, for example, involved in the collision. Even if one automobile is struck on its side, however, it is preferable for the bumper of the striking automobile to be located at a generally constant distance from the roadway at all times so that lateral reinforcement in the sides of automobiles can be located in relatively limited regions of the automobiles sides.

One approach to overcoming the disadvantages inherent in mounting a bumper on a resiliently supported automobile frame or body is to design the bumper with a vertical dimension sufficiently great to compensate for all vertical movements of the bumper relative to the roadway. Such a bumper would resemble a platform, however, and would present a relatively unattractive appearance. In some automobiles, a vertically extended bumper would also adversely affect the operation of other mechanisms in the automobile, such as the cooling system for an engine located in the front of the automobile.

SUMMARY OF THE INVENTION

The present invention is directed to a vehicle bumper arrangement which enhances the effectiveness of the vehicle bumper by ensuring that the unavoidable changes in distance between the vehicle body or frame and the roadway do not adversely affect the bumper. In particular, the invention comprises apparatus for maintaining generally constant the distance between a traveled surface and a bumper oriented transversely of a vehicle at one end of the vehicle. The apparatus includes a support for the bumper and two mounts for the support. The two mounts are coupled to the support and impart different movements to the support upon movement generally perpendicular to the traveled surface by a vehicle body portion located adjacent the bumper. The different movements imparted to the support effect movement of the bumper relative to the adjacent vehicle body portion opposite in direction and approximately equal in amplitude to the movement of the adjacent body portion.

In one embodiment of the invention, the bumper support includes a lever and the bumper is mounted at one end of the lever. At its other end, the lever is mounted on the vehicle body by one of the two mounts for the support. The second mount is coupled to the lever intermediate the ends of the lever and includes an arm coupled at its ends to a vehicle wheel and to the vehicle body, respectively. The lever is coupled to the arm intermediate the ends of the arm.

In another embodiment of the invention, the second mount includes two fluid cylinders, coupled to a vehicle wheel and communicating with each other. Pistons are received in the cylinders for reciprocating movement and are coupled to the lever and to the vehicle body, respectively.

As can be seen from the above descriptions of two embodiment of the invention, both mounts for the bumper support are in some manner coupled to the vehicle body and, consequently, impart movements to the support relative to the traveled surface. Nonetheless, because the second mount is also coupled to a wheel for the vehicle, the movement imparted to the bumper support by the second mount is different from the movement imparted to the support by the first mount. As a result, the different movements can be utilized to maintain the bumper carried by the support at a generally constant vertical distance from the traveled surface.

In the first described embodiment of the invention, for example, a desired relationship between the movements imparted to the bumper support by the two mounts can be selected by appropriate location of the lever along the length of the arm of the second mount. Then by properly selecting the location of the second mount along the length of the lever, the different movements imparted by the two mounts can be coordinated to produce little or no movement of the bumper end of the support. In the second described embodiment of the invention, the relationship between the movements imparted to the bumper support by the two mounts is determined by appropriate selection of the strokes of the two pistons of the second mount.

The vehicle bumper arrangement according to the invention is designed primarily to maintain a bumper at a generally constant height above a roadway or other traveled surface and the mounts for the bumper support may be attached to parts of the vehicle that are relatively weak and can not absorb impact energy to any appreciable extent. Accordingly, a conventional device for absorbing impact energy should preferably be mounted on the vehicle inwardly of the bumper. In addition, at least the second mount for the bumper support should include a releasable coupling for the support. The coupling releases the bumper support from the mount upon application of a load on the bumper exceeding a predetermined release load. The mount will thus assist in maintaining the bumper at its proper height above the traveled surface until immediately before an impact, but then will release the bumper support so that the force of the impact is not transmitted through the support to the mount and the vehicle body. The use of the bumper support primarily for adjustment of the bumper height also permits the bumper apparatus to be of the self-regenerating type known in the art.

BRIEF DESCRIPTION OF THE DRAWINGS

For a better understanding of the invention, reference may be made to the following description of two exemplary embodiments, taken in conjunction with the figures of the accompanying drawings, in which:

FIG. 1 is a schematic side view of a motor vehicle provided with a bumper arrangement according to the invention;

FIG. 2 is a graphical representation of the relative movements of various portions of the bumper arrangement of FIG. 1;

FIG. 3 is an end view of the bumper arrangement of FIG. 1;

FIG. 4 is a graphical representation of the vertical movements of various portions of the bumper arrangement of FIG. 1, as viewed in FIG. 3; and FIG. 5 is a schematic side view of a vehicle provided with another bumper arrangement according to the invention.

DESCRIPTION OF EMBODIMENTS

FIG. 1 of the drawings schematically illustrates one side of the front end of an automobile equipped with a bumper 1 oriented transversely of the automobile. The bumper 1 is normally located at a distance $a$ from the surface, such as a road, on which the automobile is supported by its wheel 2. The wheel 2 is coupled to the body (not shown) of the automobile by a piston-type shock absorber 3 extending generally vertically from the wheel. The wheel 2 is also coupled to the automobile body by an arm 4 extending generally horizontally from the wheel and generally perpendicular to the plane of FIG. 1. Although FIG. 1 illustrates only one side of the automobile, the other side of the automobile is of similar, but mirror image construction.

The automobile bumper 1 is carried at one end of a lever 5 extending longitudinally of the automobile. At the other end 6 of the lever 5, a mount attaches the lever end to the body (not shown) of the automobile. Intermediate its ends, the lever 5 is pivoted on the arm 4 and is thereby divided into two lever portions 7 and 8 at the pivot point 9.

The mounting of the lever 5 on the arm 4 can be seen more clearly in FIG. 3, which illustrates that the lever is carried on the arm 4 at a point intermediate the ends of the arm. At the left end 10 of the arm 4, as viewed in FIG. 3, the arm is pivotally connected to the cylinder of the shock absorber 3, which is, in turn, connected to the wheel 2. At its other end 11, the arm 4 is connected to the automobile body (not shown).

In FIG. 4, relative movements of the ends 10 and 11 and the pivot point 9 of the arm 4 relative to the roadway are graphically represented, the central line representing the normal position of the arm 4. As can be seen, the left end 10 of the arm 4 remains at a fixed vertical position since the end 10 is coupled to the wheel 2. While on occasion the wheel 2 may actually leave the roadway, it can normally be assumed to be at a relatively constant distance therefrom. The right end of the arm 4 executes the full range of vertical movement of the automobile body above and below the normal or "at rest" position of the arm 4, as indicated by the arrows shown to the right of the graph in FIG. 4. The point 9 at which the lever 5 is pivoted on the arm 4 moves in generally the same direction as the right end 11 of the arm 4, but with a diminished amplitude since the pivot point is closer to the non-moving left end 10 of the arm 4.

Returning now to FIG. 2, which illustrates the movements of various points along the lever 5, it can be seen that the right end 6 of the lever also executed a full range of movement with the vehicle body from the normal or at rest position of the lever represented by the central line on the graph of FIG. 2. The movement of the pivot point 9, however, which is determined by the relative location of the pivot point 9 on the arm 4, has the same direction but is diminished in amplitude relative to the movement of the end 6 of the lever 5. As a result, the bumper 1 remains at a generally constant vertical distance $a$ from the roadway. The movements of the lever 5 at its right end 6 and the pivot point 9 can be coordinated to produce the desired result by appropriate location of the pivot point 9 along the lever 5.

FIG. 5 illustrates a second embodiment of the invention in which the intermediate mount for the lever 5 is a pair of intercommunicating fluid cylinders 13 and 14 mounted on a piston-type shock absorber 17 for an automobile wheel (not shown). The two cylinders 13 and 14 are rigidly connected and communicate with each other through a passage 19. The lever 5 is connected at its pivot point 9 with a piston 12 that is slidably received in the cylinder 13. The cylinder 14 slidably receives a piston 15 that is coupled to the piston rod 16 for the shock absorber 17. The piston rod 16 is, in turn, connected at one end 18 with the automobile body (not shown).

In operation, movement of the vehicle body relative to the roadway produces movement of the piston rod 16 in the shock absorber 17 and corresponding movement of the piston 15 in the cylinder 14. The movement of the piston 15 is transmitted to the piston 12 by fluid flowing from the cylinder 14 through the passage 19 into the cylinder 13. The resultant movement of the piston 12 moves the lever 5 at its pivot point 9 to achieve the counter movement of the bumper 1, relative to the automobile body, to maintain a generally constant height of the bumper above the roadway. The movement of the lever 5 at the pivot point 9 can be selected relative to the movements of the automobile body and the end 6 of the lever by selecting the relationship between the strokes of the pistons 12 and 15, for example.

In order to avoid transmitting impact forces to the relatively weak portions of the automobile to which the lever 5 is coupled, as for example the shock absorber or axle for a wheel, the connections between the lever 5 and its mount should preferably be designed to that if an impact occurs, little or no impact force is transmitted through the lever 5, particularly to the arm 4. Thus, the connection at the pivot point 9 includes a hinge pin designed to shear off under loads corresponding to impact loads on the bumper 1 greater than a predetermined release load. Such a connection may also be provided at the right end 6 of the lever 5 and any other conventional device for providing a relatively weak connection may be utilized.

Impact energy resulting from a collision will be absorbed by conventional energy dissipating or absorbing elements, such as the impactor cup 20 shown in FIGS. 1 and 5. The impactor cup 20 is fabricated of sheet metal and is designed in the form of a bellows. When an impact load is applied on the bumper 1, the impactor cup 20 collapses and dissipates or absorbs energy transmitted to the bumper by the impact.

The object of the invention can also be achieved by eliminating the intermediate mount for the lever 5 and utilizing a single piston-cylinder mount. Specifically, the lever 5 could carry the bumper 1 at one end and be rigidly mounted on a piston-cylinder arrangement at its other end. The piston and cylinder would be coupled to a shock absorber in a manner generally similar to the piston-cylinder arrangement illustrated in FIG. 5.

In the illustrated embodiments of the invention, couplings or connections described as being to the automobile body can also be made to the automobile frame. Similarly, couplings or connections described as being to an automobile wheel or to a shock absorber for a wheel can be made to other automobile components, such as an axle, connected to and moving vertically with a wheel.

It will be understood that the above described embodiments are merely exemplary and that those skilled in the art may make many variations and modifications without departing from the spirit and scope of the invention. All such modifications and variations are intended to be within the scope of the invention as defined in the appended claims.

I claim:

1. In a vehicle having at least one end thereof bumper means including a bumper oriented transversely of the vehicle and located at a distance from a traveled surface on which the vehicle is supported, the improvement of means for maintaining the distance between the bumper and the traveled surface generally constant comprising:

a. support means for supporting the bumper, the support means including lever means mounting at one end thereof the bumper, b. first means mounting the support means and coupled to the other end of the lever means, and c. second means mounting the support means and including an arm coupled at one end to a wheel for the vehicle and coupled at its other end to the vehicle body, the lever means being coupled intermediate its ends to the arm of the second mounting means intermediate the ends of said arm, the first and second mounting means imparting different movements to the support means upon movement generally perpendicular to the traveled surface by a vehicle body portion located adjacent the bumper, the different movements imparted to the support means effecting movement of the bumper relative to the adjacent vehicle body portion opposite in direction and approximately equal in amplitude to the movement of the adjacent vehicle body portion.

2. The improvement of claim 1, wherein the different movements imparted to the support means have generally the same direction and different amplitudes.

3. The improvement of claim 1, wherein the first mounting means mounts the other end of the support means on the vehicle body.

4. The improvement of claim 1, wherein the bumper means further includes means for absorbing impact energy disposed inwardly of the bumper on the vehicle and wherein the second mounting means includes means releasably coupling the second mounting means to the support means, the coupling means being adapted to release the support means from the second mounting means upon application of a load on the bumper exceeding a predetermined release load.

* * * * *